(12) United States Patent
Voigt et al.

(10) Patent No.: US 11,572,605 B2
(45) Date of Patent: Feb. 7, 2023

(54) PROCESS FOR LEACHING A MINERAL PARTICULATE MATERIAL

(71) Applicant: Glencore Technology Pty Limited, Brisbane (AU)

(72) Inventors: Paul Benjamin Voigt, Brisbane (AU); Ahmad Ghahreman, Kingston (CA)

(73) Assignee: Glencore Technology Pty Limited, Brisbane (AU)

( * ) Notice: Subject to any disclaimer, the term of this patent is extended or adjusted under 35 U.S.C. 154(b) by 480 days.

(21) Appl. No.: 16/620,011

(22) PCT Filed: Jun. 7, 2018

(86) PCT No.: PCT/AU2018/050565
§ 371 (c)(1),
(2) Date: Dec. 6, 2019

(87) PCT Pub. No.: WO2018/223190
PCT Pub. Date: Dec. 13, 2018

(65) Prior Publication Data
US 2020/0190624 A1 Jun. 18, 2020

(30) Foreign Application Priority Data
Jun. 8, 2017 (AU) ................. 2017902196

(51) Int. Cl.
| | | |
|---|---|---|
| *C22B 3/00* | (2006.01) | |
| *C22B 3/16* | (2006.01) | |
| *C22B 11/08* | (2006.01) | |
| *C22B 3/42* | (2006.01) | |
| *C22B 3/24* | (2006.01) | |

(52) U.S. Cl.
CPC ........... *C22B 3/16* (2013.01); *C22B 3/24* (2013.01); *C22B 3/42* (2013.01); *C22B 11/08* (2013.01)

(58) Field of Classification Search
CPC .... C22B 3/24; C22B 3/44; C22B 3/06; C22B 3/08; C22B 3/22; C22B 11/08; C22B 11/04; C22B 15/0071; C22B 23/043
See application file for complete search history.

(56) References Cited

U.S. PATENT DOCUMENTS

| | | |
|---|---|---|
| 4,206,023 A | 6/1980 | Au |
| 4,405,569 A | 9/1983 | Dienstbach |

FOREIGN PATENT DOCUMENTS

| | | |
|---|---|---|
| CN | 101698904 A | 4/2010 |
| CN | 102618724 A | 8/2012 |
| CN | 102888510 A | 1/2013 |
| GB | 172101 A | 11/1921 |
| WO | WO-2007053947 A1 | 5/2007 |

OTHER PUBLICATIONS

Volchek, K.M, et al.; "Treatment of the Residue of Chlorine Leaching of the Converter Matte Classification Sands"; Proceedings of the Kola Scientific Center; Russian Academy of Sciences, Chemistry and Materials Science; Special Issue; Apatity; ISSN 2307-5252; ISBN 978-5-91137-331-3; May 2015; pp. 117-119.
Yu, Hong; International Search Report for PCT/AU2018/050565; dated Aug. 3, 2018; 6 pages.

*Primary Examiner* — Steven J Bos
(74) *Attorney, Agent, or Firm* — Shackelford, Bowen, McKinley & Norton, LLP

(57) ABSTRACT

A process for leaching a mineral particulate material comprising the steps of feeding the mineral particulate material to a leaching step (10) in which at least one valuable metal in the mineral particulate material is leached into a leach solution to form a pregnant leach liquor and a solid residue containing undissolved mineral matter, the leaching step being conducted under conditions such that elemental sulphur is formed in the leaching step, wherein beads or particles that take up elemental sulphur are added to the leaching step such that elemental sulphur is taken up by or collects on the beads or particles, and separating the beads or particles from the pregnant leach liquor and the solid residue. The beads or particles may be treated to remove sulphur and the beads or particles are returned to the leaching step. Alternatively the mineral doesn't need to comprise a soluble component and can be a refractory sulphide of iron and/or arsenic containing precious metals that require oxidation before downstream conventional processes such as cyanidation.

27 Claims, 1 Drawing Sheet

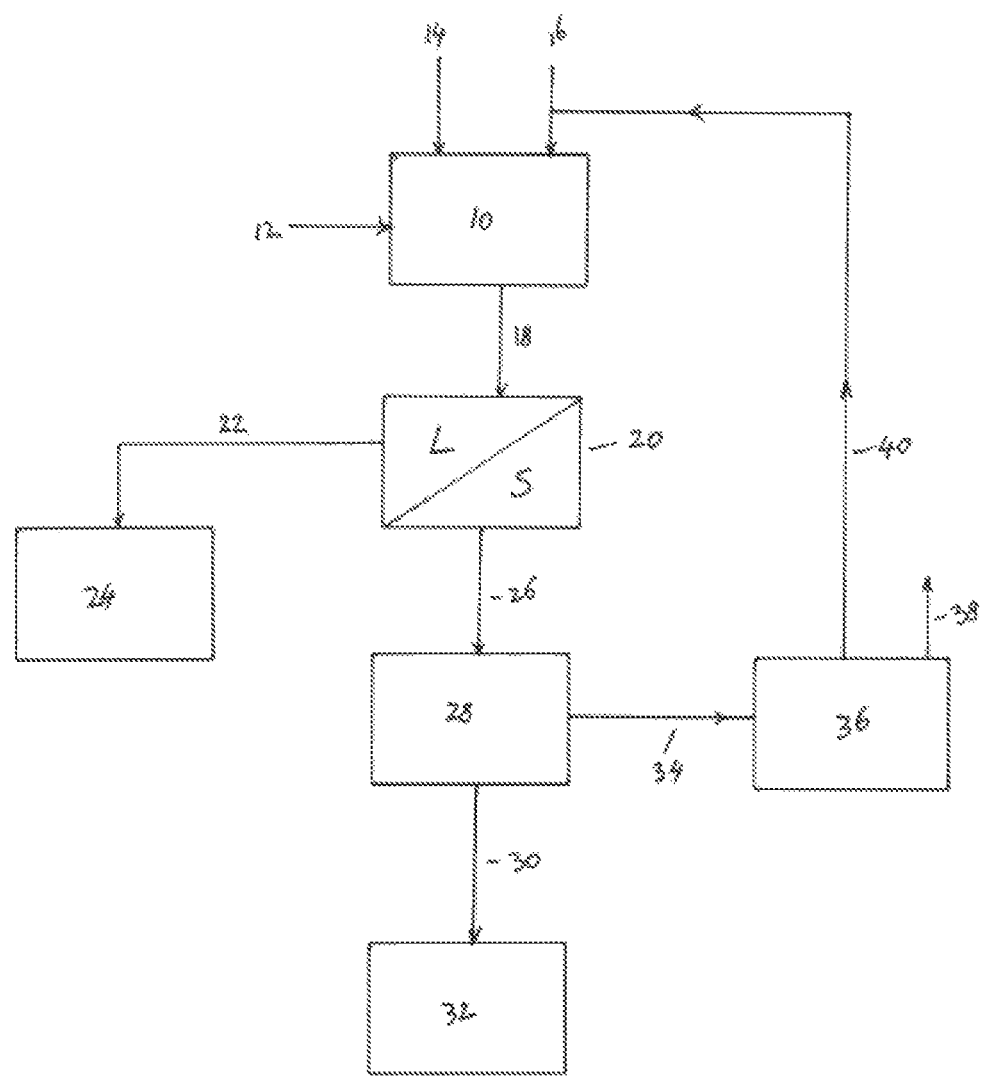

PROCESS FOR LEACHING A MINERAL PARTICULATE MATERIAL

TECHNICAL FIELD

The present invention relates to a leaching process. In particular, the present invention relates to a leaching process that generates elemental sulphur but is operated such that elemental sulphur does not report to a solid residue of the leaching process.

BACKGROUND ART

A number of processes for treating mineral ores or concentrates involve leaching the ore or concentrate under conditions such that desired metals go into solution. The solution is then separated from a solid residue and the solution is treated to recover the desired metal from solution. In some instances, some valuable metals or other components remain with the solid residue and it can be desirable to further treat the solid residue from the leaching step to recover valuable metals therefrom.

To provide one example of this, the Albion Process (which is a trademark of the present applicant) involves treating ores or concentrates, typically sulphide ores or concentrates, containing copper, cobalt, lead, zinc, iron and/or nickel as well as precious metals, by leaching in an acid regime under oxidative conditions. The copper, cobalt, zinc and/or nickel present in the ore or concentrate are dissolved into solution and can be recovered from the solution following solid/liquid separation. If the ore or concentrate also contains silver or gold, the silver or gold does not dissolve into solution and stays with the solid residue. It can be desirable to recover the silver or gold from the solid residue. A cyanidation process is typically used to recover the silver or gold from the solid residue. Another example is where precious metals are contained in sulphide concentrates that must first be oxidised before treatment in conventional flowsheets such as gold contained in pyrite and treatment in a cyanidation process following oxidation.

Due to the oxidative conditions under which the leaching step occurs in the Albion process, sulphides in the ore or concentrate are oxidised to form elemental sulphur. The elemental sulphur is in the form of a solid and it reports to the solid residue following the solid/liquid separation step. When the solid residue is treated with cyanide, the elemental sulphur consumes significant quantities of cyanide. This can adversely impact on both the processing and the economics of the silver gold recovery process. To address this issue, some solid residues containing elemental sulphur are subjected to a flotation step. The elemental sulphur floats and the rest of the solids report to tails, thereby enabling elemental sulphur to be separated from the solid residue. However, some of the silver or gold can also float with the elemental sulphur. This, of course, results in a loss of valuable yield of silver or gold or requires treatment in another unit operation for recovery.

It will be clearly understood that, if a prior art publication is referred to herein, this reference does not constitute an admission that the publication forms part of the common general knowledge in the art in Australia or in any other country.

SUMMARY OF INVENTION

The present invention is directed to a process for leaching a mineral particulate material under conditions such that elemental sulphur is formed, which may at least partially overcome at least one of the abovementioned disadvantages or provide the consumer with a useful or commercial choice.

With the foregoing in view, the present invention in one form, resides broadly in a process for leaching a mineral particulate material comprising the steps of feeding the mineral particulate material to a leaching step in which at least one valuable metal in the mineral particulate material is leached into a leach solution to form a pregnant leach liquor and a solid residue containing undissolved mineral matter, the leaching step being conducted under conditions such that elemental sulphur is formed in the leaching step, wherein beads or particles that take up elemental sulphur are added to the leaching step or added to a slurry from the leaching step such that elemental sulphur is taken up by or collects on the beads or particles, and separating the beads or particles from the pregnant leach liquor and the solid residue.

The process can also be applied where precious metals are contained in sulphide concentrates that must first be oxidised before treatment in conventional flowsheets such as gold contained in pyrite and treatment in a cyanidation process following oxidation. This will be described in more detail hereunder with reference to the third aspect of the present invention.

In one embodiment, the mineral particulate material has a particle size distribution such that a maximum particle size of the mineral particulate material is smaller than a minimum particle size of the beads or particles, and the beads or particles having elemental sulphur thereon or therein are separated from the solid residue using a size separation process. The size separation process may comprise a sieving process or may comprise separation based upon sizing cyclones or centrifugation. Other size separation processes may also be used.

In another embodiment, the solid residue is separated from the particles of beads or resin using a gravity separation process or a heavy media separation process. In this regard, the sulphur-loaded beads or particles may have a lower specific gravity than the particulate material of the solid reside and the mixture of beads or particles and solid residue may be fed to a heavy media separator containing a heavy media having a specific gravity between the specific gravity of the sulphur-loaded beads or particles and the specific gravity of the solid residue. This will result in the sulphur-loaded beads or particles floating to the top of the heavy media and the solid residue sinking to the bottom of the heavy media, thereby enabling separation of the sulphur-loaded beads or particles from the solid residue.

In one embodiment, the solid residue is further treated to recover one or more valuable components therefrom following separation of the beads or particles from the solid residue.

In one embodiment, the solid residue contains gold and/or silver and the solid residue is further treated by contacting with cyanide to dissolve at least some of the gold or silver. The residue may also contain other minor elements such as the Platinum Group Metals (PGM's). The platinum group metals may include one or more of platinum, ruthenium, rhodium, palladium, osmium and iridium.

In one embodiment, the particles or beads having elemental sulphur thereon or therein are treated to remove elemental sulphur therefrom and the particles or beads are subsequently returned to the leaching step.

In one embodiment, the particles or beads having elemental sulphur thereon or therein are treated to remove elemental sulphur by heating the particles or beads in a furnace to cause the elemental sulphur to melt or to sublimate or to vaporise to thereby enable the elemental sulphur to be removed form the particles or beads. Alternative techniques include pressure leaching of the sulphur laden resin to generate sulphuric acid for recycle to the leaching process or dissolution of the elemental sulphur from the resin with an organic solvent such as toluene.

In one embodiment, the elemental sulphur recovered form the particles or beads is recovered and sold, or used in another process or another processing step.

In one embodiment, the particles or beads comprise particles or beads of an ion exchange resin, or particles or beads of a carbonaceous material.

In one embodiment, the particles or beads comprise a microporous carbon-based catalyst sold under the trademark Lewatit AF5 ("AF5"). AF5 is in the form of small spherical beads. According to its manufacturer, AF5 has a narrow particle size distribution, a large surface area and a well-defined pore distribution. It has excellent mechanical stability and a high specific surface area. AF5 is normally used as a polisher in water treatment and for the adsorption of traces of organic substances such as chlorinated hydrocarbons, MTBE, organic phosphates, amines, pesticides, herbicides and metabolites. According to its manufacturer, the particle diameter distribution can be adjusted or individually designed to fulfil customer requirements.

In one embodiment, the minimum particle size of the beads or particulates is at least twice as large as a maximum particle size of the mineral particulate material. In another embodiment, the minimum particle size of the beads or particulates is at least 5 times as large as a maximum particle size of the mineral particulate material, or at least 10 times as large as the maximum particle size of the mineral particulate material, or at least 15 times as large as the maximum particle size of the mineral particulate material, or at least 20 times as large as the maximum particle size of the mineral particulate material, or at least 50 times as large as the maximum particle size of the mineral particulate material, or at least 100 times as large as the maximum particle size of the mineral particulate material.

In one embodiment, the mineral particulate material has a maximum particle size of 500 µm, or 400 µm, 300 µm, or 200 µm, 100 µm, or 80 µm, or 70 µm, or 60 µm, or 50 µm, or 40 µm, 30 µm, or 20 µm. In one embodiment, the beads or particles have a minimum particle size of 10 mm, or 5 mm, or 4 mm, more 3 mm, or 2 mm, 1 mm, or 900 µm, or 800 µm, or 700 µm, or 600 µm, or 500 µm, or 400 µm, 350 µm, or 300 µm, or 250 µm, or 200 µm.

In one embodiment, the leaching step comprises an acidic leaching step that is conducted under oxidative conditions such that sulphides present in the mineral particulate material are oxidised to form elemental sulphur in the leaching step. The leaching step may be conducted under conditions of above atmospheric pressure and at a temperature that is above ambient temperature.

In one embodiment, the mineral particulate material comprises a sulphide containing material. The mineral particulate material may comprise one or more of copper sulphide, lead sulphide, zinc sulphide, iron sulphide, arsenic sulphide, nickel sulphide or some combination of many general mineral groups. The mineral particulate material may also include precious metals, such as gold or silver. The mineral particulate material may comprise a refractory sulphide material. Generally, it is not viable to dissolve refractory sulphide materials at ambient pressure in mild acidic media and dissolution of these refractory minerals typically requires very harsh conditions in the presence of oxidant materials.

The processing conditions used in the leaching step should not be considered to be limiting to the present invention and the present invention encompasses any conditions in the leaching step that enables one or more valuable metals to be dissolved into the leach solution to form a pregnant leach liquor whilst at the same time forming elemental sulphur in the leaching step.

The leaching step results in the formation of a pregnant leach solution that contains one or more dissolved valuable metals, a solid residue comprising the undissolved residue of the mineral particulate material and the particles or beads that have elemental sulphur thereon or therein. In the process of the present invention, this mixture is separated into a pregnant leach solution having low solids content or virtually no solids content, a solid residue comprising the undissolved residue of the mineral particulate material, and the particles or beads having elemental sulphur thereon or therein. Any known separation steps may be used to obtain the required separations.

In one embodiment, a solid/liquid separation is conducted in order to separate the pregnant leach solution from the solid residue and the beads or particles having elemental sulphur thereon or therein. The solid/liquid separation may comprise a single step process in which the pregnant leach solution is separated from the solid residue and the beads or particles. The solid/liquid separation may comprise a multistep process in which the pregnant leach solution is first separated from the solid residue and then separated from the beads or particles. The solid/liquid separation may comprise a multistep process in which the pregnant leach solution is first separated from the beads or particles and then separated from the solid residue.

Any suitable solid/liquid separation technique may be used, including filtration, decantation, settling, thickening, centrifugation, cyclone separation, elution or the like. The present invention should not be considered to be limited to the particular solid/liquid separation technique used.

In one embodiment of the present invention, the solid/liquid separation step removes pregnant leach solution from a mixture of solids that comprises the solid residue and the beads or particles having sulphur thereon or therein. The mixture of solids will also typically contain residual pregnant leach solution. The process of the present invention may further comprise separating the mixture of solids into a solid residue containing stream and a stream containing the beads or particles having sulphur thereon or therein.

In a second aspect, the present invention provides a process for recovering a precious metal from a mineral particulate material comprising the steps of feeding the mineral particulate material to a leaching step in which at least one valuable metal in the mineral particulate material is leached into a leach solution to form a pregnant leach liquor and a solid residue containing undissolved mineral matter and undissolved precious metal, the leaching step being conducted under conditions such that elemental sulphur is formed in the leaching step, wherein beads or particles that take up elemental sulphur are present in the leaching step or added to a slurry from the leaching step such that elemental sulphur is taken up by or collects on the beads or particles, separating the beads or particles from the pregnant leach liquor and the solid residue, and treating the solid residue to recover precious metal therefrom.

Another embodiment of the present invention may be used in instances where precious metals are contained in sulphide concentrates that must first be oxidised before treatment in conventional flowsheets such as gold contained in pyrite and treatment in a cyanidation process following oxidation.

The present invention can also be used to treat sulphide minerals or concentrates in which the valuable minerals remain with the solids. Accordingly, in a third aspect, the present invention provides a process for treating a mineral sulphide particulate material comprising the steps of feeding the mineral sulphide particulate material to an oxidation step in which a slurry containing the mineral sulphide particulate material is formed and elemental sulphur is formed by oxidation of at least some of the mineral sulphide particulate material, wherein the slurry is contacted with beads of particles that take up elemental sulphur such that elemental sulphur is taken up by or collects on the beads or particles.

In one embodiment of the third aspect of the present invention, the beads or particles are separated from other solids in the slurry. The beads or particles may also be separated from the liquid in the slurry.

The liquid separated from the slurry may be discarded or it may be treated, for example, by a neutralisation step, prior to disposal in a tailings dam. Alternatively, the slurry may be neutralised prior to separating the solids from the liquid. In that case, dissolved metals may be precipitated back onto the solids by the neutralisation step.

The other solids from the slurry are suitably separated from the beads or particles that are loaded with elemental sulphur. The other solids may, for example, contain undissolved precious metals, and the precious metals may be recovered using conventional flow sheets, such as cyanidation flow sheets.

In one embodiment, the sulphide material comprises pyrites. In the oxidation step, iron will go into solution. Accordingly, the slurry or the solution may be treated to neutralise the solution. This may cause iron compounds to precipitate. If the slurry is treated by the neutralisation solution, iron can precipitate back onto the solids in the slurry. If the liquid is separated from the slurry prior to neutralisation, the iron can be precipitated in a separate neutralisation step.

In one embodiment, the precious metal is gold and/or silver. In one embodiment, the mineral particulate material comprises a sulphide containing particulate material. In one embodiment, the mineral particular material comprises a refractory sulphide ore or concentrate.

In one embodiment, the solid residue is treated with a cyanidation process to extract the precious metal into a cyanide solution, followed by recovery of the precious metal from the cyanide solution.

In one embodiment, the beads or particles that are loaded with elemental sulphur are treated to remove elemental sulphur therefrom and the beads or particles subsequently returned to the leaching step. The elemental sulphur can then be stored or sold as a revenue stream.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawing, in which:

FIG. 1 shows a flowsheet of a process in accordance with an embodiment of the present invention.

DESCRIPTION OF EMBODIMENTS

It will be appreciated that the drawings have been provided for the purposes of describing a preferred embodiment of the present invention. Therefore, it will be understood that the present invention should not be considered to be limited solely to the features as shown in the attached drawings.

FIG. 1 shows a flowsheet of a process in accordance with an embodiment of the present invention. The flowsheet shown in FIG. 1 is suitable for recovering metal, such as copper, cobalt, iron, arsenic, zinc or nickel from a sulphide ore or concentrate, especially a refractory sulphide ore or concentrate. The process includes a leaching step 10 in which a finely ground sulphide concentrate 12 that contains sulphides of lead, copper, cobalt, iron, arsenic, zinc and/or nickel, as well as silver and gold dispersed throughout the particulate matrix. The sulphide concentrate is pre-treated by using ultrafine grinding to reduce the particle size to generally below 50 µm, with a $P_{80}$ of 20 µm or less, or even a $P_{80}$ of 10 to 12 µm. The finely ground stream of particulate concentrate 12 is fed to the leaching step 10.

The leaching step 10 may be operated in accordance with the Albion Process operating parameters. The Albion Process is proprietary technology of the present applicant and is well known in this art. The Albion Process comprises ultrafine grinding of the sulphide concentrate, followed by oxidative leaching under atmospheric conditions. By subjecting the concentrate to ultrafine grinding, it is possible to use oxidative leaching under atmospheric conditions in order to solubilise the valuable metals in the concentrate. The temperature of the leaching step may be at any temperature of up to just below the boiling point of the leaching solution. Typical Albion Process leaching steps are operated at temperatures of from 90 to 95° C.

A leach solution 14 is also added to the leaching step 10. The leach solution 14 may comprise an acid. Beads or particles 16 of a material that is capable of taking up or collecting elemental sulphur are also added to the leaching step 10.

The leaching step 10 is typically conducted in one or more leaching reactors. Air or oxygen is injected into the leaching slurry contained in the leaching reactors and the leaching reactors are typically stirred to ensure that the slurry does not settle. Under the conditions in the leaching step 10, copper, cobalt, zinc, arsenic, iron and/or nickel are dissolved into the leach liquor (lead does not dissolve and remains with the solid residue). The sulphides are converted to sulphates and elemental sulphur by the oxidation step. The elemental sulphur forms as a solid material. Sulphates are distributed between the solution and solid phases.

As previously mentioned, beads of particles 16 of a material that is capable of taking up or collecting elemental sulphur are also added to the leaching step 10. The beads or particles 16 may comprise a resin, or an activated carbon-based catalyst. In the example shown in FIG. 1, beads or particles of AF5, a microporous carbon-based catalyst material, are used. The beads or particles of AF5 have a particle size that falls within the range of from 350 µm to 800 µm. It will be appreciated that this particle size is significantly larger than the particle size of the particulate concentrate 12.

As elemental sulphur is formed in the leaching step 10, it is taken up onto and into the beads or particles of AF5. AF5 is believed to have a greater affinity for elemental sulphur then the particulate concentrate 12 and therefore the elemental sulphur preferentially adheres to or absorbs on the beads or particles of AF5. In the absence of beads or particles of AF5, the elemental sulphur would be laid down upon the particles of particulate concentrate. Alternatively, the resin can be contacted with the process slurry after the leaching step in a separate vessel, such as an agitated contact tank.

A slurry 18 is removed from the leaching step 10. The slurry 18 contains a pregnant leach solution containing dissolved copper, zinc and/or nickel, a solid residue that comprises the undissolved residue of the particulate concentrate 12 that is fed to the leaching step 10, and sulphur-loaded beads or particles of AF5. Alternatively, there may be minimal solubilised metals in the case where predominantly precious metals are hosted in a sulphide concentrate. This slurry is sent to a solid/liquid separation step 20. This may comprise a filtration process, a settling process, a decantation process or a thickening process. The pregnant leach solution is removed via line 22 and sent to metal recovery process 24. The metal recovery process 24 may comprise electrowinning, solvent extraction/electrowinning, or mixed product precipitation, or indeed any other conventional metal recovery process for recovering dissolved metals from solution.

The solids that are separated from the pregnant leach solution in solid/liquid separation step 20 comprise a mixture of the sulphur-loaded beads or particles of AF5 and the undissolved solid residues of the mineral concentrate 12. This mixture is removed via stream 26 and sent to a solid/solid separation process 28. Although not shown in FIG. 1, the mixed stream 26 may be subjected to one or more washing steps to remove residual pregnant leach solution therefrom.

The solid/solid separation process is designed to separate the sulphur loaded beads or particles of AF5 from the solid residue obtained from the leached mineral concentrate. As set out above, the beads or particles of AF5 are sized in the range of from 350 μm to 800 μm, whereas the particulate material 12 that is fed to the leaching step has been subjected to ultrafine grinding and generally has a maximum particle size that is less then 50 μm. Therefore, a sieve or a screen having a sieve or screen opening sized between 50 μm and 350 μm can effectively and efficiently separate the sulphur loaded beads of AF5 from the solid residue. The solid residue passes through the sieve or screen whereas the beads or particles of AF5 are retained on top of the sieve or screen. The solid residue underflow 30 from the sieve or screen 28 is sent to a precious metal recovery processing plant 32, where gold or silver in the solid residue can be recovered. Conventional technology, such as a precious metal recovery processes based upon cyanide extraction followed by recovery of gold and silver from the cyanide solution may be used. Alternatively, step 28 can occur before the solid liquid separation in step 20 where the resin is removed first.

The sulphur loaded beads or particles of AF5 (34) are removed from the sieve or screen and sent to a muffle furnace 36. In the furnace, the particles are heated to cause the elemental sulphur to melt, sublimate or vaporise and therefore be removed from the beads or particles of AF5. The sulphur 38 may be captured and recovered for sale or further use. The beads or particles of AF5 that have had sulphur removed therefrom are sent via line 40 back to the leaching step 10. In the process of removing sulphur from the resin, the resin can be heated or, in an alternative process, it can be subjected to pressure leaching to produce an acidic solution. The resin is not degraded by acid conditions. Alternatively, the sulphur can be recovered by pressure leaching the loaded resin to generate acid or solubilising the resin with an organic solvent such as toluene.

A similar flowsheet to that shown in FIG. 1 can be used to treat, for example, pyrites that contain gold. In step 10 of FIG. 1, a slurry is produced and the slurry is oxidised. This step may be conducted under acidic conditions. This converts some of the sulphur in the pyrites to elemental sulphur. Iron will typically go into solution. A neutralisation step may be conducted on the slurry prior to solids/liquid separation step 20. Alternatively, the liquid stream 22 separated from the slurry may be separately neutralised. The remainder of the process is generally similar to that as shown in FIG. 1 and similar processing conditions may also be used.

It has been found that adding beads or particles of a material that can take up elemental sulphur in the leaching step can enable a simple solid/solid separation process to be used to remove the elemental sulphur from the solid residue from the leach process. Most of the precious metals in the solid residue remain with the solid residue. Only small amounts of the precious metals may be taken up on the beads or particles of the material that can take up elemental sulphur in the leaching step. As a result, reagent consumption (such as cyanide) in subsequent processing of the solid residue to recover precious metals therefrom is lowered as the elemental sulphur is largely not present in the further processing of the solid residue. This decreases the cost of operating the process. Good yields of the precious metals are obtained.

Further, the beads or particles of material that can take up elemental sulphur can be treated, such as by a simple heating step, to remove elemental sulphur therefrom, thereby allowing the beetle particles to be recycled to the leaching step. This further improves the economics of the process.

In order to demonstrate embodiments of the present invention, the following examples were conducted:

Example 1

In this example, a simple experiment was conducted on a lead and sulphur residue arising from Albion Process leaching of a bulk zinc/lead concentrate. The residue filter cake sample was slurried in water and sulphuric acid added to change the pH to 1.0 to replicate the working conditions of the process. Particles of AF5 were also added to the re-slurrying step. The leaching slurry was held 80° C. and mixed at 300 rpm for 24 hours. Following completion of the test the particles of AF5 were screened out. The solid residue was recovered by filtration. The AF5 particles and the solid residue were washed with dilute sulphuric acid solution. This resulted in four products being obtained for analysis, these being (1) solid residue, (2) AF5 resin coated with elemental sulphur, (3) filtrate (which corresponds to the pregnant leach solution) and (4) wash water from a single washing step (collected from washing the resin and the solid residue). Appropriate analysis was conducted which determined that 60% of the total sulphur from the concentrate was collected on the resin surface. 40% of sulphur remained in the solid residue. 100% of the lead remained in the residue. No lead was detected on the resin (lead does not dissolve into the leach solution under the leaching conditions used).

The actual analytical results for this test are set out in tables 1, 2 and 3:

TABLE 1

| Solid Sample | [Pb] % | [S] % | [Zn] % | [Ag] % |
|---|---|---|---|---|
| Lead/Sulphur Con. 1 | 16.8 | ~45 | 1.6 | 0.008 |
| Lead/Sulphur Con. 2 | 15.6 | ~47 | 1.7 | NA |

TABLE 2

| Solid Sample | [Pb] % | [S] % | [Zn] % | [Ag] % |
|---|---|---|---|---|
| Solid Residue After leach | 27.3 | 27.6 | 0.2 | 0.013 |
| AF5 Resin after leach | <DL | 17.9 | <DL | 0.0005 |

TABLE 3

| Liquid Sample | [Pb]mg/L | [S]mg/L | [Zn]mg/L | [Ag]mg/L |
|---|---|---|---|---|
| Filtrate | 1.5 | 4518 | 713.3 | <DL |
| Wash Water | 0.4 | 1315 | 37.3 | <DL |

The above results show that almost all the zinc in the lead concentrate dissolved into the filtrate (which was the pregnant leach solution) and wash water. No zinc was detected on the AF5 and 8% of the total zinc remained in the solid residue. All of the silver was detected in the solid residue and only trace amounts on the AF5. Silver present on the AF5 was detected at very low levels, close to the detectable limit, so it is possible to conclude that the AF5 had practically no silver.

Example 2

In this example, the following tests were conducted:
a) sulphur recovery test. In this test, 257.7 g of lead concentrate that had been subjected to ultrafine grinding was contacted with 210 g resin (AF5 beads) for 24 hours at 80° C. in pH 1.5 (sulphuric acid). 68 g of elemental sulphur was recovered on the resin. 95% of the silver stayed in the solid residue and 4.86% of the silver was recovered on the resin with the elemental sulphur.
b) cyanide leach #1—the as received solid residue, which includes the sulphur loaded resin (AF5 beads) and the solid residue of the sulphide concentrate, was contacted with cyanide solution at pH 10.5 for 24 hours. Silver recovered on carbon (and filtrate) was 38.5%.
c) cyanide leach #2—this cyanidation test was conducted by separating the sulphur loaded resin beads from the solid residue and then subjecting the solid residue to the cyanidation test. The solid residue following separation from the sulphur loaded beads was contacted with cyanide solution at pH 10.5 for 24 hours. Silver recovery on carbon (and filtrate) was 50%.

The analytical results for example 2 are shown in table 4.

The results of example 2 show that silver recovery increases from 37% in instances where the elemental sulphur is present in the cyanidation test, to 50% in instances where the elemental sulphur is separated from the solid residue and only the solid residue subjected to the cyanidation test. Further, it is expected that the amount of cyanide that is required to be used in the cyanidation step would be reduced by removing the elemental sulphur from the solid residue prior to the cyanidation step. It is expected that significant better results can be obtained with optimised conditions.

Although the examples describe the use of AF5 beads to take up elemental sulphur, it will be appreciated that the present invention encompasses the use of any beads or particles that can take up elemental sulphur during the leaching step. The beads or particles should desirably be able to withstand the conditions encountered during the leaching step. The beads or particles should also desirably be able to be treated to release the elemental sulphur therefrom to enable the beads or particles to be recycled to the leaching step.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

Example 3

Resin loaded with elemental sulphur was treated in a thermal process under low oxygen conditions at 400° C. for two hours to fume elemental Sulphur for collection.

Elemental Sulphur was generated in the furnace and condensed on cooled surfaces for collection as pure, bright yellow elemental sulphur.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

TABLE 4

| Sulfur recovery test Lead Concentrate | Mass (g) | Volume (mL) | Sulfur Assay (ppm) | Sulfur Assay (%) | Sulfur Units (g) | Sulfur Recovery (ppm) | Lead Assay (ppm) | Lead Assay (%) | Lead Units (g) | Lead Recovery (ppm) |
|---|---|---|---|---|---|---|---|---|---|---|
| Samples | | | | | | | | | | |
| Mass Leached | 257.70 | | | 49.47 | 127.48 | | | 19.00 | 48.96 | |
| Filtrate | | 970 | 11946 | | 11.59 | 9.09 | 4.28 | | 0.004 | 0.01 |

TABLE 4-continued

| | | | Sulfur | | | | Lead | | | |
|---|---|---|---|---|---|---|---|---|---|---|
| Wash | | 4700 | 1034 | | 4.86 | 3.81 | 3.69 | | 0.017 | 0.04 |
| sulfur from | | | | | −9.80 | −7.69 | | | | |
| sulfuric acid | | | | | | | | | | |
| Washed Solids | 177.28 | | | 30.16 | 53.47 | 41.94 | | 26.10 | 46.27 | 94.50 |
| Washed resin (started with 210 g Resin) | 263.20 | | | 25.85 | 68.04 | 53.37 | | 0.00 | 0.00 | 0.00 |
| Total | | | | | 128.15 | 100.52 | | | 46.29 | 94.54 |

| Sulfur recovery test Lead Concentrate | | Zinc | | | | Silver | | | |
|---|---|---|---|---|---|---|---|---|---|
| | | Assay (ppm) | Assay (%) | Units (g) | Recovery (ppm) | Assay (ppm) | Assay (%) | Units (g) | Recovery (ppm) |
| Samples | | | | | | | | | |
| Mass Leached | | | 0.75 | 1.93 | | | 0.021 | 0.05 | |
| Filtrate | | 1137 | | 1.103 | 57.06 | 0.00 | | 0.00 | 0.00 |
| Wash | | 39.80 | | 0.187 | 9.68 | 0.00 | | 0.00 | 0.00 |
| sulfur from sulfuric acid | | | | | | | | | |
| Washed Solids | | | 0.16 | 0.28 | 14.68 | | 0.029 | 0.05 | 95.00 |
| Washed resin (started with 210 g Resin) | | | 0.00 | 0.00 | 0.00 | | 0.001 | 0.00 | 4.86 |
| Total | | | | 1.57 | 81.42 | | | 0.05 | 99.86 |

| Cyanide leach#1 Lead Concentrate | Mass (g) | Volume (mL) | Sulfur | | | | Lead | | | |
|---|---|---|---|---|---|---|---|---|---|---|
| | | | Assay (ppm) | Assay (%) | Units (g) | Recovery (ppm) | Assay (ppm) | Assay (%) | Units (g) | Recovery (ppm) |
| Samples | | | | | | | | | | |
| Mass Leached | 149.42 | | | 49.90 | 74.56 | | | 19.00 | 28.39 | |
| Filtrate | | 2470 | 916 | | 2.26 | 3.03 | 1.30 | | 0.003 | 0.01 |
| Wash | | 1050 | 394 | | 0.41 | 0.55 | 0.47 | | 0.000 | 0.00 |
| Washed Solids | 122.19 | | | 46.54 | 56.87 | 76.27 | | 19.10 | 23.34 | 82.21 |
| activated Carbon | 6.71 | | | 0.00 | 0.00 | 0.00 | | 0.00 | 0.00 | 0.00 |
| Total | | | | | 59.54 | 79.86 | | | 23.34 | 82.22 |

| Cyanide leach#1 Lead Concentrate | | Zinc | | | | Silver | | | |
|---|---|---|---|---|---|---|---|---|---|
| | | Assay (ppm) | Assay (%) | Units (g) | Recovery (ppm) | Assay (ppm) | Assay (%) | Units (g) | Recovery (ppm) |
| Samples | | | | | | | | | |
| Mass Leached | | | 0.75 | 1.12 | | | 0.021 | 0.03 | |
| Filtrate | | 15.80 | | 0.039 | 3.48 | 0.14 | | 0.0003 | 1.125 |
| Wash | | 0.00 | | 0.000 | 0.00 | 0.00 | | 0.00 | 0.00 |
| Washed Solids | | | 0.60 | 0.73 | 65.42 | | 0.017 | 0.02 | 66.57 |
| activated Carbon | | | 0.00 | 0.00 | 0.00 | | 0.171 | 0.01 | 37.32 |
| Total | | | | 0.77 | 68.90 | | | 0.03 | 105.02 |
| | | | | | | | Ag recovery on carbon + solutions | | 38.45 |

| Cyanide leach#2 Treated lead concentrate | Mass (g) | Volume (mL) | Sulfur | | | | Lead | | | |
|---|---|---|---|---|---|---|---|---|---|---|
| | | | Assay (ppm) | Assay (%) | Units (g) | Recovery (ppm) | Assay (ppm) | Assay (%) | Units (g) | Recovery (ppm) |
| Samples | | | | | | | | | | |
| Mass Leached | 150.10 | | | 30.16 | 45.27 | | | 26.10 | 39.18 | |
| Filtrate | | 2600 | 901 | | 2.34 | 1.84 | 0.72 | | 0.002 | 0.00 |
| Wash | | 1090 | 354 | | 0.39 | 0.30 | 0.79 | | 0.001 | 0.00 |
| Washed Solids | 142.20 | | | 26.30 | 37.40 | 82.61 | | 26.20 | 37.26 | 95.10 |
| activated Carbon | 11.06 | | | 0.00 | 0.00 | 0.00 | | 0.00 | 0.00 | 0.00 |
| Total | | | | | 40.13 | 84.75 | | | 37.26 | 95.11 |

TABLE 4-continued

| Cyanide leach#2 Treated lead concentrate | Zinc | | | | Silver | | | |
|---|---|---|---|---|---|---|---|---|
| | Assay (ppm) | Assay (%) | Units (g) | Recovery (ppm) | Assay (ppm) | Assay (%) | Units (g) | Recovery (ppm) |
| Samples | | | | | | | | |
| Mass Leached | | 0.16 | 0.24 | | | 0.029 | 0.043 | |
| Filtrate | 0.00 | | 0.000 | 0.00 | 0.58 | | 0.0015 | 3.523 |
| Wash | 1.23 | | 0.001 | 0.07 | 0.00 | | 0.00 | 0.00 |
| Washed Solids | | 0.16 | 0.23 | 94.74 | | 0.018 | 0.03 | 58.61 |
| activated Carbon | | 0.00 | 0.00 | 0.00 | | 0.179 | 0.02 | 46.13 |
| Total | | | 0.23 | 94.81 | | | 0.05 | 108.26 |
| Ag recovery on carbon + solutions | | | | | | | | 49.65 |

The invention claimed is:

1. A process for leaching a mineral particulate material comprising the steps of feeding the mineral particulate material to an oxidative leaching step in which at least one valuable metal in the mineral particulate material is leached into a leach solution to form a pregnant leach liquor and a solid residue containing undissolved mineral matter, the leaching step being conducted under oxidative conditions such that elemental sulphur is formed via oxidation in the leaching step, wherein beads or particles that take up elemental sulphur are added to the leach solution in the leaching step or added to a slurry from the leaching step such that elemental sulphur is taken up by or collects on the beads or particles, and separating the beads or particles having elemental sulphur thereon or therein from the pregnant leach liquor and the solid residue; wherein the mineral particulate material has a particle size distribution such that a maximum particle size of the mineral particulate material is smaller than a minimum particle size of the beads or particles, and the beads or particles having elemental sulphur thereon or therein are separated from the solid residue using a size separation process.

2. The process as claimed in claim 1 wherein the size separation process comprises a sieving process or comprises separation based upon sizing cyclones or centrifugation.

3. The process as claimed in claim 1 wherein the solid residue is separated from the particles of beads or resin using a gravity separation process or a heavy media separation process.

4. The process as claimed in claim 1 wherein the solid residue is further treated to recover one or more valuable components therefrom following separation of the beads or particles from the solid residue.

5. The process as claimed in claim 4 wherein the solid residue contains gold and/or silver and the solid residue is further treated by contacting with cyanide to dissolve at least some of the gold or silver.

6. The process as claimed in claim 1 wherein the particles or beads having elemental sulphur thereon or therein are treated to remove elemental sulphur therefrom and the particles or beads are subsequently returned to the leaching step.

7. The process as claimed in claim 6 wherein the particles or beads having elemental sulphur thereon or therein are treated to remove elemental sulphur by heating the particles or beads in a furnace to cause the elemental sulphur to melt or to sublimate or to vaporise to thereby enable the elemental sulphur to be removed from the particles or beads, or by heating in an autoclave to generate sulphuric acid or by dissolving sulphur in an organic solvent such as toluene.

8. The process as claimed in claim 6 wherein the elemental sulphur recovered from the particles or beads is recovered.

9. The process as claimed in claim 1 wherein the particles or beads comprise particles or beads of an ion exchange resin, or particles or beads of a carbonaceous material.

10. The process as claimed in claim 9 wherein the particles or beads comprise a microporous carbon-based catalyst that is in the form of small spherical beads.

11. The process as claimed in claim 1 wherein the minimum particle size of the beads or particulates is at least twice as large as a maximum particle size of the mineral particulate material, or the minimum particle size of the beads or particulates is at least 5 times as large as a maximum particle size of the mineral particulate material, or at least 10 times as large as the maximum particle size of the mineral particulate material, or at least 15 times as large as the maximum particle size of the mineral particulate material, or at least 20 times as large as the maximum particle size of the mineral particulate material, or at least 50 times as large as the maximum particle size of the mineral particulate material, or at least 100 times as large as the maximum particle size of the mineral particulate material.

12. The process as claimed in claim 1 wherein the mineral particulate material has a maximum particle size of 500 µm, or 400 µm, 300 µm, or 200 µm, 100 µm, or 80 µm, or 70 µm, or 60 µm, or 50 µm, or 40 µm, 30 µm, or 20 µm.

13. The process as claimed in claim 1 wherein the beads or particles have a minimum particle size of 10 mm, or 5 mm, or 4 mm, more 3 mm, or 2 mm, 1 mm, or 900 µm, or 800 µm, or 700 µm, or 600 µm, or 500 µm, or 400 µm, 350 µm, or 300 µm, or 250 µm, or 200 µm.

14. The process as claimed in claim 1 wherein the leaching step comprises an acidic leaching step that is conducted under oxidative conditions such that sulphides present in the mineral particulate material are oxidised to form elemental sulphur in the leaching step.

15. The process as claimed in claim 1 wherein the mineral particulate material comprises a sulphide containing material selected from one or more of copper sulphide, lead sulphide, zinc sulphide, nickel sulphide, cobalt sulphide, arsenic sulphide or iron sulphide.

16. The process as claimed in claim 1 wherein the leaching step results in the formation of a pregnant leach solution that contains one or more dissolved valuable metals, a solid residue comprising the undissolved residue of the mineral particulate material and the particles or beads that have elemental sulphur thereon or therein and this mixture is separated into a pregnant leach solution having low solids content or no solids content, a solid residue comprising the undissolved residue of the mineral particulate material, and the particles or beads having elemental sulphur thereon or therein.

17. The process as claimed in claim 1 wherein a solid/liquid separation is conducted in order to separate the pregnant leach solution from the solid residue and the beads or particles having elemental sulphur thereon or therein, wherein the solid/liquid separation comprises a single step process in which the pregnant leach solution is separated from the solid residue and the beads or particles or the solid/liquid separation comprises a multistep process in which the pregnant leach solution is first separated from the solid residue and then separated from the beads or particles, or the solid/liquid separation comprises a multistep process in which the pregnant leach solution is first separated from the beads or particles and then separated from the solid residue.

18. The process as claimed in claim 17 wherein the solid/liquid separation step removes pregnant leach solution from a mixture of solids that comprises the solid residue and the beads or particles having sulphur thereon or therein and the process further comprises separating the mixture of solids into a solid residue containing stream and a stream containing the beads or particles having sulphur thereon or therein.

19. A process for recovering a precious metal from a mineral particulate material comprising the steps of feeding the mineral particulate material to an oxidative leaching step in which at least one valuable metal in the mineral particulate material is leached into a leach solution to form a pregnant leach liquor and a solid residue containing undissolved mineral matter and undissolved precious metal, the leaching step being conducted under oxidative conditions such that elemental sulphur is formed via oxidation in the leaching step, wherein beads or particles that take up elemental sulphur are present in the leaching step or added to a slurry from the leaching step such that elemental sulphur is taken up by or collects on the beads or particles, separating the beads or particles having elemental sulphur thereon or therein from the pregnant leach liquor and the solid residue, and treating the solid residue to recover precious metal therefrom; wherein the mineral particulate material has a particle size distribution such that a maximum particle size of the mineral particulate material is smaller than a minimum particle size of the beads or particles, and the beads or particles having elemental sulphur thereon or therein are separated from the solid residue using a size separation process.

20. The method as claimed in claim 19 wherein the precious metal is gold and/or silver.

21. The method as claimed in claim 19 wherein the mineral particulate material comprises a sulphide containing particulate material or a refractory sulphide ore or concentrate.

22. The method as claimed in claim 19 wherein the solid residue is treated with a cyanidation process to extract the precious metal into a cyanide solution, followed by recovery of the precious metal from the cyanide solution.

23. The method as claimed in claim 19 wherein the beads or particles that are loaded with elemental sulphur are treated to remove elemental sulphur therefrom and the beads or particles subsequently returned to the leaching step.

24. A process for treating a mineral sulphide particulate material comprising the steps of feeding the mineral sulphide particulate material to an oxidative leaching step in which a slurry containing the mineral sulphide particulate material is formed and elemental sulphur is formed by oxidation of at least some of the mineral sulphide particulate material, wherein the slurry is contacted with beads or particles that take up elemental sulphur such that elemental sulphur is taken up by or collects on the beads or particles and separating the beads or particles having elemental sulphur thereon or therein from other solids in the slurry and from liquid in the slurry; wherein the mineral sulphide particulate material has a particle size distribution such that a maximum particle size of the mineral sulphide particulate material is smaller than a minimum particle size of the beads or particles, and the beads or particles having elemental sulphur thereon or therein are separated from the other solids using a size separation process.

25. The process as claimed in claim 24 wherein the slurry is neutralised or the liquid separated from the slurry is neutralised.

26. The method as claimed in claim 24 wherein other solids from the slurry are separated from the beads or particles that are loaded with elemental sulphur and the other solids contain undissolved precious metals and the precious metals are subsequently recovered.

27. The method as claimed in claim 24 wherein the sulphide material comprises pyrites.

\* \* \* \* \*